2 Sheets—Sheet 2.
S. B. MARTIN.
ICE-MACHINE.
No. 173,316. Patented Feb. 8, 1876.
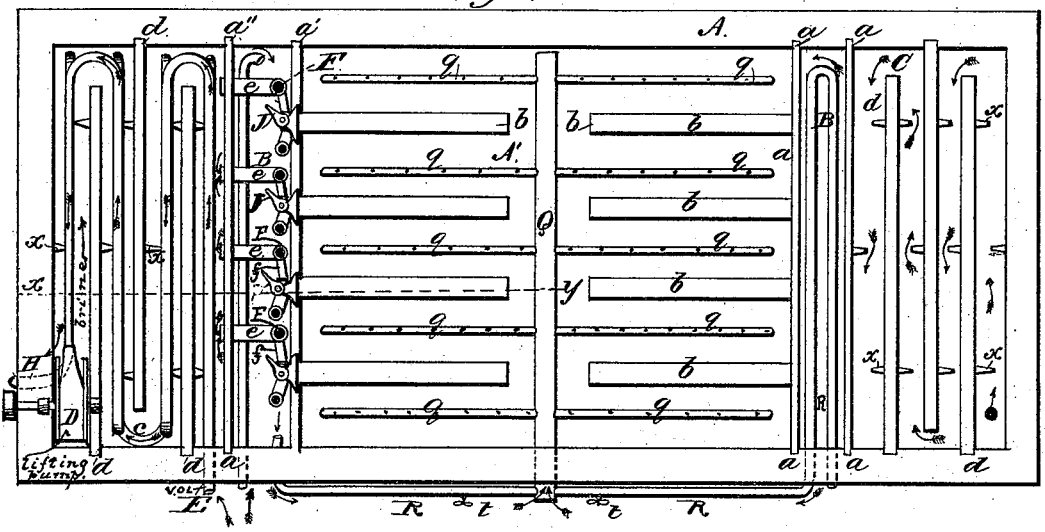
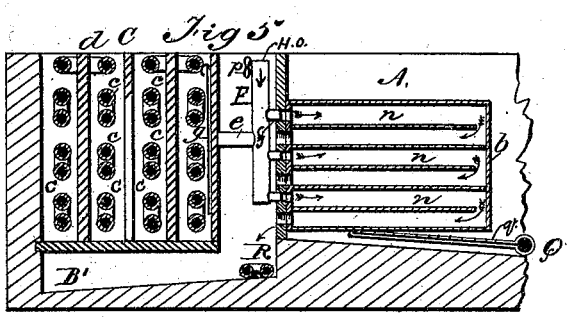
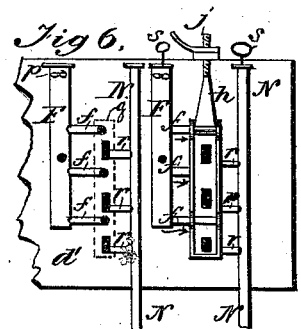
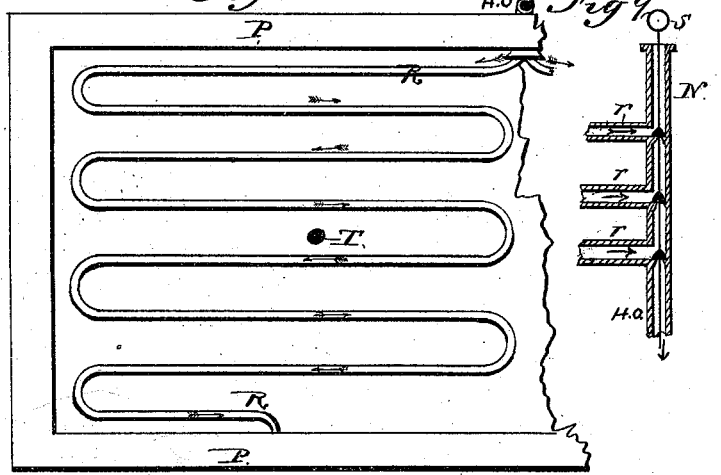
Witnesses
Harry C. Clark
C. C. Reeve
Inventor
Saml. B. Martin
By Hew Beadle & Attys.
N. PETERS, PHOTO-LITHOGRAPHER, WASHINGTON, D. C.

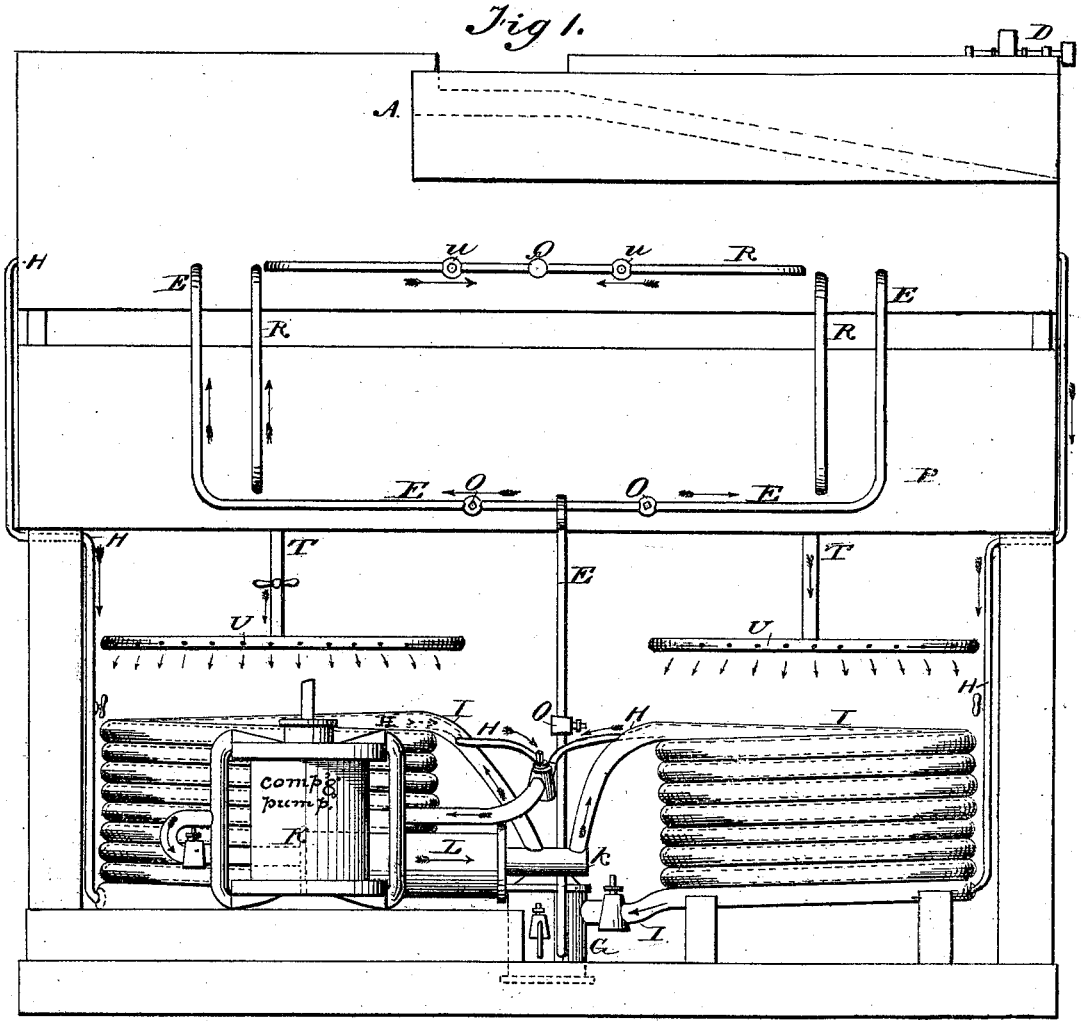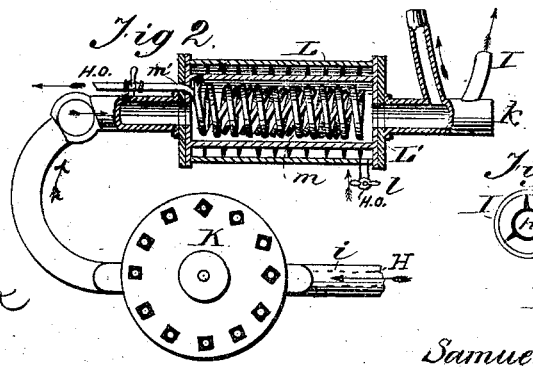

UNITED STATES PATENT OFFICE.

SAMUEL B. MARTIN, OF SAN FRANCISCO, CALIFORNIA.

IMPROVEMENT IN ICE-MACHINES.

Specification forming part of Letters Patent No. 173,316, dated February 8, 1876; application filed November 4, 1873.

*To all whom it may concern:*

Be it known that I, SAMUEL B. MARTIN, of San Francisco, in the county of San Francisco and State of California, have invented certain new and useful Improvements in Machines for the Manufacture of Ice and the Production of Artificial Cold; and I do hereby declare that the following is a full, clear, and exact description of the same, reference being had to the accompanying drawings and to the letters marked thereon.

This invention relates to that class of ice-machines in which an incongealable liquid cooled by a volatile liquid is employed to abstract heat from the water to be frozen; and it consists mainly, first, in a new method of forming ice, consisting, essentially, in causing the cooling agent to flow continuously through a hollow freezing-plate in a stream turned upon itself, so that that which flows out of the plate moves in close proximity with that passing into the plate, by which means the particles having the highest and lowest temperatures are brought together, and the temperature of the entire plates equalized, for the purpose of forming ice of uniform thickness; second, in a new method of forming ice, consisting, essentially, in causing an incongealable liquid to flow from a main body of liquid held in a cooling-tank, through a hollow freezing-plate, in independent streams, the same being returned to the main body of liquid after abstracting heat from the plate, for the purpose of being cooled again, the circulation of the same being continuous; third, in connection with the manufacture of ice on plates in freezing-tanks, my invention further consists in a novel process of freeing the water to be frozen from air, consisting, essentially, in providing a supply of water in excess of the amount made into ice, and causing a portion of the same to rise through the central water-space, and flow in a constant stream from the freezing-tank, substantially as described. It further consists in the peculiar construction of the apparatus employed, and in certain combinations of the various parts, all of which will be fully described hereinafter.

In the drawings, Figure 1 represents a front elevation of my improved apparatus; Fig. 2, a top view, partly in section, of the cooling-cylinder L and compressing-pump K, connected therewith; Fig. 3, a transverse section of the double pipe, forming the condensing-coils; Fig. 4, a plan view of the congealing-tank and the parts immediately connected therewith; Fig. 5, a vertical section of one-half of the tank through the line $x\,y$, Fig. 4; Fig. 6, an elevation, in detail, of the mechanism employed to control the flow of liquids in the freezing-plates; Fig. 7, an elevation of the mechanism employed to control the flow of the incongealable liquid from the tank in which it is cooled; Fig. 8, a plan view of one-half of the tank which receives the water used for detaching the ice, and also the waste-water from the freezing-tank, its contents being discharged upon the condensing coils beneath; Fig. 9, a vertical section of one of the pipes adapted to carry off from the freezing-plates the water employed to detach the ice.

To enable others skilled in the art to make my improved apparatus, and use the same in accordance with my improved methods, I will now proceed to describe fully the construction of the same, and the manner of using it.

A general statement of the operation of my improved apparatus may be made as follows:

A system of pipes is employed, through which a volatile liquid, by suitable means, is caused to circulate continuously, which liquid, by evaporation or vaporization, abstracts heat from an incongealable liquid surrounding a proper length of the pipe located within a tank, the vapor of the liquid being cooled and condensed to liquid again, to throw off the heat abstracted from the incongealable liquid and prepare it for use again.

The incongealable liquid, cooled by the evaporation of the volatile liquid in the system of pipes referred to, is permitted to flow from its main tank, by means of proper pipes controlled by suitable gates, into and through a series of independent hollow freezing-plates located in the freezing or congealing tank, in which is held the water to be frozen.

The liquid, after flowing through the freezing-plates, falls into a lower tank, from which it is lifted into the main tank again by means of a pump.

The flow of the incongealable liquid is continuous; but it may be cut off from any one of the freezing-plates, when it is desired to remove the ice therefrom, without affecting the operation of the others.

The water to be frozen, after being properly cooled, is admitted at the bottom of the freezing-tank, through a perforated pipe, in a constant stream; the overflowing water being caught in a tank below.

The ice is removed from any one of the plates by shutting off the supply of the incongealable liquid, and causing, instead, a stream of water of suitable temperature to flow through it, and thus raise its temperature sufficiently to disengage the ice.

The construction of apparatus and the method of using it will now be described in detail.

For convenience and clearness of description, the apparatus will first be described under separate heads as follows: first, that part employed in connection with the volatile liquid; second, that part employed in connection with the incongealable liquid; third, that part employed in connection with the water supplied to the freezing-tank; fourth, that part employed in connection with the water used to detach the ice from the freezing-plates.

1. That part of the apparatus employed in connection with the volatile liquid: G, Fig. 1, represents a receiver, constructed in any proper manner, which contains a proper quantity of volatile liquid. E E represent pipes having suitable cocks O O, which connect the receiver G with the pipes in the chambers C C of the upper tank, which pipes are suitably bent and rebent to form the stacks c c c, as shown in Figs. 4 and 5. H H, Figs. 1 and 4, represent a continuation of the pipes c c, which extend from the upper tank to and through the interior of the condensing-coils by means of an inner pipe, as shown in Fig. 3, to the compressing-pump K, as shown in Fig. 1. L, Figs. 1 and 2, represents a peculiarly-constructed cylinder, hereinafter fully described, which is connected at one end, by a suitable pipe, to the compressing-pump K, and at the other to the outer pipe of the condensing-coils I, which terminate in the receiver G, as shown in Fig. 1.

It will be understood from this description that the volatile liquid in the receiver, when the machine is in operation and the cocks O O O are open, in consequence of the action of the pump K, will flow, through the pipes E, into the stacks c c c in the tanks containing the incongealable liquid, and there, expanding into vapor, will abstract heat from this liquid. It will then pass, in the form of vapor, through the pipes H H, to the bottom of the condensing-coils, and thence up through the coils, by means of the inner pipes, to the top, and from thence to the pump, where it is compressed and sent forward through cylinder L and the outer pipes of the condensing-coils to the receiver G, which it enters in a liquid state.

The volatile liquid, by its evaporation or vaporization in the tank of the incongealable liquid, abstracts heat therefrom. This heat is removed from the vaporized liquid to fit it for use again by condensation and by the application of cooling agents.

The compression of the vapor by the action of the pump evolves its latent heat, which is removed by its passage, through the cylinder L and condensing-coils I, to the receiver G, it being surrounded in the cylinder by a constant stream of cold water, and being caused to pass through the condensing-coils about the inner pipe containing the comparatively cold vapor, moving in the opposite direction from the stacks, receiving at the same time, also, on the outside of the pipe, a stream of cold water from the spraying-pipes U T above, as shown in Fig. 1.

The construction of the cylinder, which is shown in Figs. 1 and 2, is as follows: It is provided with a spiral flange or diaphragm, encircling it from one end to the other, and, also, with an outer shell of wood, by means of which a spiral channel-way is formed in the space intervening between the cylinder and shell, to which water is supplied at one end by means of the pipe $l$. The other end of the channel-way discharges into one end of a pipe arranged in a double coil, extending from end to end in the central space, and terminating in the discharge-pipe $m'$.

The construction of the condensing-coil, with its outer and inner pipes, is clearly shown in Fig. 3. The inner pipe is preferably made with radiating flanges, by which means the space between the pipes is accurately determined, and the gas is consequently permitted to move with perfect regularity. The inner pipe may be drawn with the flanges, and then be placed within the outer pipe.

2. That part employed in connection with the incongealable liquid: A represents the upper tank, which is divided by means of the partitions $a\ a$ upon each side into a central tank, A', which is the freezing or congealing chamber, and two end tanks, C C, which are the cooling-tanks for the incongealable liquid, and two intervening chambers, B B, the uses of which will be fully described hereinafter.

$b\ b$ represent freezing-plates, constructed preferably of thin metal attached to a frame, which are suitably located in the freezing-tank A' at proper distances apart, and rigidly attached at one end above the floor of the tank to the adjacent partition $a$, as shown in Figs. 4 and 5. The outer ends may be supported, if necessary, in any suitable manner, suspension from above, however, being preferred. These plates are hollow, as shown in Fig. 5, and are separated by longitudinal partitions into several independent sections, which are again partially subdivided by diaphragms $n$, extending nearly to the outer or rear wall of the plate, and forming a continuous channel-way from the front or inner end of the plate above the diaphragm to the rear end, and then again to the front end of the plate below the diaphragm.

Each section of the plate is provided above and below the diaphragm, at the point of its connection with the partition $a$, with suitable openings, which extend through the partition, the openings above the diaphragm being designed for the entrance of liquid, and those below for its discharge.

The entrance-openings of each section are provided with a short pipe, $f$, Fig. 6, which terminates at the other end in the main pipe F, having a supply-pipe, $e$, communicating with the tank C, as shown in Fig. 5.

The discharge-opening of each section communicates directly with the chamber B, and the liquid passing through them falls to the bottom thereof, and settles in the chamber B' beneath the tank C, as shown in Fig. 5.

The supply of incongealable liquid to the plates is regulated by means of the gates $g$ $g$, Figs. 5 and 7, which control the opening of the pipe $e$, one gate being provided for each pipe $e$, which pipe supplies only a single freezing-plate.

The discharge of incongealable liquid from the plates is regulated by the gates $h$, Fig. 6, which control the discharge-openings, and may be accurately adjusted to enlarge or decrease the size of the outlet by means of the hand-nuts $j$, as shown.

The tanks C C are each provided with diaphragms or partitions $d$ $d$, alternately attached to either side, and extending nearly across the tank, by means of which a continuous channel-way of great length is formed, as shown. Attached to these diaphragms, at suitable intervals and on alternate sides of the channel-way, are vertical pieces or riffles $x$, as clearly shown in Fig. 4. $c$ $c$, Figs. 4 and 5, represent stacks composed of the pipe containing the volatile liquid, bent and rebent upon itself, and occupying the central space through the entire channel-way, as shown. D represents a pump, adapted in any suitable manner to lift the incongealable liquid discharged from the freezing-plates into the chamber B' into the tank C.

From this description it will be understood that the incongealable liquid has a continuous circulation. Being cooled by contact with the stacks $c$ $c$, it flows, through the pipes $e$ $e$ F F $f$ $f$, into the upper part of the channel-way of each section of the freezing-plates, and from thence through the lower portion into the chambers B B', from which it is raised into the tank C by the pump D. The amount of liquid supplied to the freezing-plates is regulated by the entrance-gates $g$ $g$, and its delivery from the plates by the discharge-gates $h$ $h$.

If desired at any time, the supply of liquid may be entirely cut off from any one of the plates without interfering at all with the operation of the remainder of the apparatus.

It will be observed that the incongealable liquid is delivered by the pump D into the tank C at one end of the channel-way, and that it flows into the freezing-plates at the other end of the channel-way, so that the entire quantity is compelled to traverse the entire length of the channel-way and come into contact with all the stacks of pipe before it passes to the freezing-plates. On the other hand, it will be observed that the volatile liquid enters the stacks $c$ $c$ at the opposite end of the channel-way, and passes out at that end which first receives the incongealable liquid. To secure the most intimate contact of the liquid with the pipes the vertical pieces or riffles $x$ are provided, which serve to interrupt the flow of liquid upon one side, and direct it through the stack of pipes toward the other side, from which it is thrown back again by contact with the next piece $x$.

3. That part employed in connection with the water supplied to the freezing-tank: S, Fig. 8, represents the supply-pipe communicating with some suitable reservoir. R R are branch pipes, each of which is bent and rebent upon itself to cover the floor of the tank P, and then extended upward into the chamber B', upon the floor of which it is bent upon itself, as indicated in Fig. 5, and extended to the main pipe Q, located upon the floor of the freezing-tank, as shown in Figs. 1, 4, and 5. $q$ $q$ represent perforated branch pipes, centrally located in the space between the freezing-plates next the floor, as shown in Figs. 4 and 5.

The supply of water to the tank is constant—first, in order that that which is removed in the form of ice may be replaced; second, that the tank P may be supplied with water much reduced in temperature, for the purpose of cooling the pipes R R and the condensing-coils I, the water being discharged upon the latter by means of the pipe T and perforated tube-ring U; and, third, that the air discharged in the act of freezing may be conveyed away by the flowing stream, so that an excess of air cannot accumulate and cause the freezing ice to become porous.

It will be understood that the incoming stream does not, in any sense, flow over the surface of the freezing-plates or the surface of the freezing ice, as set forth and claimed by John M. Beath in his Letters Patent of the United States, dated October 11, 1875, because it ascends in a vertical plane in the central water-space, which always remains unfrozen, even when the maximum amount of ice is made, its action being that of a conveyer to raise to the surface the air dislodged in the freezing-space.

From this description it will be understood that the water to be frozen is first cooled in the tank P by the overflow-water, and also the water employed to detach the ice, as will be described hereinafter, and is then exposed in chamber B to the action of the incongealable liquid which falls upon it from the discharge-openings of the freezing-plates, so that when it enters the freezing-chamber its temperature has been greatly reduced. It will be understood, also, that the incoming water from the perforated pipes is of a higher temperature than the water already in the tank, and that it consequently rises through it, and carries with it the air disengaged by the act of freezing to the surface, where it escapes.

It will be understood, also, in this connection, that the freezing-plates are so arranged in the tank that an intervening space is left between the slabs of ice when the maximum amount has been formed, say six inches space between blocks of ice twelve inches thick, in order that the air may be thrown off from the water by the freezing action into the intervening space, and be carried off as described, it being found in practice that it is impossible to expel the air when there is an accumulation in excess of the natural quantity.

4. That part employed in connection with the water used to detach the ice from the freezing-plates: N represents a pipe, provided with the branch pipes $r\ r\ r$, Fig. 9, communicating with the discharge-openings of the freezing-plates, as shown in Fig. 6, the lower end of which discharges into the tank P. S represents a rod, having valves adapted to control the openings of the pipes $r\ r\ r$ into the pipe N. This pipe and rod are employed while the ice is being detached, and at no other time. The other parts employed in connection with them are also used for other purposes, and have heretofore been described.

The method of detaching the ice from any one of the freezing-plates is as follows: The supply of incongealable liquid is first shut off from the plate by closing the inlet of pipe $e$ by means of the gate $g$. The discharge-gates of the sections being open, all the liquid will, of course, run out into chamber B. When this has taken place the discharge-gate $h$ is closed, and water of a suitable temperature is admitted into the pipes F from above by means of the cock P, Figs. 5 and 6, which water, flowing by its own gravity into and through the sections of the freezing-plates, is discharged through the branch pipes $r\ r\ r$, Fig. 9, communicating with its discharge-openings into the main pipe N, and is thus conveyed to the tank P below. By means of this flow of water the temperature of the plate is raised, and the ice frozen to its side is consequently detached. The water itself, in passing through the freezing-plates, is lowered in temperature, and, being discharged into tank P, unites with the overflow-water from the freezing-tank, and assists in cooling the supply-pipes R R and the condensing-coils I I.

The slabs may be separated into blocks by sawing into them a little distance, and striking the back of the saw with a mallet, regular fractures being made in this way. The blocks may then be floated into the central space between the series of plates upon either side, and be taken from the tank in any suitable manner.

The operation of the machine as a whole is as follows: The receiver G is provided with the proper quantity of a volatile liquid, such as is used in such machines, or with suitable gas from a retort. The tanks C C are provided with a suitable incongealable liquid, such as a saturated solution of salt-water or chloride of calcium. The compressing-pump being operated, as before described, the volatile liquid is caused to circulate through its system of pipes, and, by vaporization, abstracts heat from the incongealable liquid in contact with the stacks of pipe in the tank C. The circulation of the volatile liquid may be termed continuous, as the operation is continuous, although the circulation may be stopped at intervals by closing the cocks O O O, to permit the liquid to accumulate sufficiently in the receiver G. The incongealable liquid, being delivered, by the pump D, into the tank C at the outer end of its extended channel-way, flows through its entire length, being thrown intimately into contact with the stacks $c\ c$ in its movement by the vertical pieces or riffles $x\ x$, which, from their position and arrangement, divert it alternately from side to side, through between the pipes. At the inner end of the channel-way the liquid passes into and through pipes $e$ F $f\ f\ f$ to the independent sections of the freezing-plates immersed in the water of the freezing-tank, through which it flows, and, being discharged into the chambers B B', is raised by the pump D again into the tank C. The continuous circulation of the cooled liquid abstracts the heat from the freezing-plates and the water in the tank, and the freezing action takes place, the ice being formed upon the sides of the plates. When the proper quantity of ice has been formed the supply of the incongealable liquid is shut off, and in its stead water above the freezing temperature is permitted to flow through the freezing-plates, in the manner hereinbefore described in detail.

It will be understood that each freezing-plate is made independent of the remaining parts of the machine, so that any one of them may be disconnected and the ice be removed from its sides without interference with the other plates, which may continue in active operation.

The heat abstracted from the water is conveyed, in the manner described, to the cylinder L and the condensing-coils, which, in turn, give it up to the cooling agents coming in contact with them. The water used in cylinder L, having its temperature raised by heat abstracted from the hot gas, may be conveyed away to the boiler to be converted into steam.

Some of the advantages of the described methods and apparatus are as follows: The operation of the machine is continuous, it not being necessary to suspend it for the purpose of removing the ice, as has been essential in previous machines using congealing-plates. The action of freezing is effected uniformly upon every part of the plate. The flow of the cool liquid through the plates being continuous, and the sections being of comparatively small area vertically and laterally, no part is cooled more than another, so that ice is formed of a uniform thickness throughout its entire extent. The ice formed is perfectly clear and solid, the air being absorbed by the water flowing in through the perforated pipes, so that it is impossible for any accumulation to take place in the space occupied by the freezing water.

In this apparatus very few cocks are required for controlling the gases, the cocks and gates employed in connection with the congealing-plates being designed for water only. In consequence of this the expense of construction is much reduced, and the apparatus can be managed by unskilled labor.

The detachment of the ice is easily effected, and without the use of a pump, the water being permitted to flow through the congealing-plates simply by its own gravity.

The employment of the riffles $x$ is advantageous, because the liquid to be cooled is brought into intimate contact with the cooling-pipes by simple and economical means. Hundreds may be employed at a trifling expense.

By means of the gates connected with the freezing-plates the freezing action can be regulated at will to produce ice quickly or slowly, as may be deemed most expedient.

This is a matter of special importance in the production of ice, from the fact that the same is a slow conductor of heat, and as all the heat withdrawn must pass through the ice already formed, the power of adjusting each plate separately, as described, becomes especially important. As the ice increases in thickness, it is necessary, in order to have it form as rapidly on such plates as on those that have little or no ice on them, that the temperature of the former should be lowered, which result is readily accomplished in the apparatus by the absolute control which the operator has over the plates.

Ice can be formed on the whole series equally without reference to the thickness of the ice. As the rate of flow of the incongealable liquid through the plates governs the intensity of the freezing power, it is only necessary to pass the liquid slower through the plates which have little or no ice on them, and more rapidly in proportion to the thickness of the ice on any of the rest of the series, to accomplish this object. This advantage will be duly appreciated when the importance of freezing only at the rate per hour necessary to produce ice of uniform good quality is fully understood.

To make good ice it is essential that a congealer-plate, or a series of plates, should be used, and that water should remain unfrozen between the slabs of ice when the maximum amount has been made.

One objection to the use of congealer-plates as heretofore constructed has been the unequal distribution of the freezing effect, the cooling agent acting most powerfully upon those portions of the plates with which it first comes in contact, and less powerfully, of course, as it advances through the plates. This difficulty is entirely remedied by my invention.

In that class of apparatus in which congealing-plates are not used, but the water is frozen in molds, it is impossible to produce ice of a good quality.

My apparatus and its parts may be constructed of any suitable size and proper material. The plates may be constructed of thin metal sheets—say, an eighth of an inch in thickness, ten feet wide, and twenty-five feet long. The channels are preferably made of small area, two inches in width and six inches in length answering for the largest sizes, in order that the difference in temperature between the stream of cold liquid as it flows into the upper part of the channel of the plate, and flows out of the lower channel with heat abstracted from the water, may be equalized by the conducting power of the metal, and the ice, consequently, be formed uniformly over every part. The incongealable liquid, also, in a small channel-way, is brought more intimately in contact with the plate than would be possible if it were permitted to flow through in large volumes.

The location of the parts is a desirable one, the freezing-tank A being over the overflow-tank P, and this over the condensing-coils I, the arrangement being compact and convenient.

The entire apparatus should be suitably inclosed; but the condensing-coils may be shut in with walls, and, to increase the condensation, atmospheric air may be employed to evaporate the water discharged upon the coils, in which case they should be covered with fibrous material.

The air, of course, may be drawn from the exterior by any suitable mechanism, and be discharged in any proper manner.

Having thus fully described my invention, what I claim as new, and desire to secure by Letters Patent, is—

1. The described process of forming ice, consisting essentially in causing the cooling agent to flow continuously through a hollow freezing-plate in a stream turned upon itself, so that that which passes out of the plate moves in close proximity with that passing into the plate, by which means the particles having the highest and lowest temperatures are brought together, and the temperature of the entire plate thus equalized, for the purpose of forming ice of uniform thickness, substantially as described.

2. The described process of forming ice, consisting essentially in causing an uncongealable liquid, cooled by contact with pipes containing a volatile fluid, to flow from the main body of liquid held in a cooling-tank, through hollow freezing-plates, in independent streams, the same being returned to the main body of liquid after abstracting heat from the plates, for purpose of being cooled again, the circulation being continuous, substantially as described.

3. In connection with the manufacture of ice in freezing tanks or plates, I claim the described process of freeing the water to be frozen from air, consisting essentially in providing a supply of water in excess of the amount made into ice, and causing a portion of the same to rise through or near the center of the water-space, and flow in a constant stream from the freezing-tank, substantially as described.

4. In the manufacture of ice in freezing-tanks, the employment of a flowing stream from the freezing-tank for the triple purpose of freeing the tank from an excess of air, cooling the incoming stream of water for supplying the freezing-tank, and for showering the condensing-coils, substantially as described.

5. In combination with a hollow freezing-plate, having inlet and outlet openings, and gates adapted to control these openings, I claim an auxiliary water-pipe and auxiliary system of gates, adapted to control the flow of the water through the plates, substantially as described.

6. The combination, in an ice-machine, of the following elements: apparatus for circulating a volatile liquid, substantially as described; apparatus for continuously circulating an incongealable liquid, substantially as described; a series of independent hollow congealing-plates, and a duplex system of gates for controlling the flow of the freezing and detaching agents, substantially as described.

7. The pipe F, having the main connection $e$ and branches $ff$, communicating with the independent section of the congealing-plate, in combination with the gates $g$ P, as described.

8. A hollow congealing-plate, constructed in independent and separate sections, each of which has a continuous channel-way, returning upon itself, for causing the streams of cooling-liquid to enter and discharge in close proximity, substantially as described.

9. The combination of a hollow congealing-plate with a double set of gates, one to control the inflow of the liquid and the other its outflow, for the purpose of regulating its speed, substantially as described.

10. The combination of the induction-pipe, having perforated branches, with the freezing-plates, whereby the pipes deliver a flowing stream in the central water-space between the plates, substantially as described.

11. The tanks C C, provided with divisions to form the extended channel-way, and with vertical riffles $x$, to divert the flow of incongealable liquid through the stacks of pipes, substantially as described.

12. The combination of the congealer-plates, the chamber B, and the pipe R, the congealing-plates discharging their contents upon pipe R in tank B, as and for the purpose described.

13. The combination of tanks A' and C and intermediate chamber B, the latter furnishing space for the location of the mechanism for controlling the flow of liquid from tank C to A', substantially as described.

14. The chamber B', in combination with the tank C, for receiving the incongealable liquid after it has been discharged from the congealing-plates.

15. The combination of the cylinder L with the spiral water-space, the double coil, the inlet and outlet pipes, and the central space for the passage of the gas, as described.

16. The combination of the freezing-tank A, cooling-tank P, and condensing-coils I I, as and for the purpose described.

17. The combination of the pipe N, to convey away the water used for detaching the ice, with the gates $h$, to close the usual openings, and prevent the water from falling into tank B', and mixing with the incongealable liquid.

In witness whereof I have hereunto set my hand.

SAML. B. MARTIN.

Witnesses:
C. W. M. SMITH,
E. McQUESTEN.